United States Patent
Bach et al.

[15] 3,688,498
[45] Sept. 5, 1972

[54] AUXILIARY FLUID SUPPLY FOR BRAKE BOOSTER

[72] Inventors: Lloyd G. Bach; Jerome T. Ewald; Keith H. Fulmer, all of South Bend, Ind.

[73] Assignee: The Bendix Corporation

[22] Filed: Sept. 21, 1970

[21] Appl. No.: 73,933

[52] U.S. Cl..................60/52 B, 60/52 S, 60/54.6 E, 91/6, 91/391 R
[51] Int. Cl.............................................F15b 13/09
[58] Field of Search .60/52 B, 54.5 E, 54.6 E, 54.5 P, 60/54.6 P, 525; 91/6, 391 R

[56] References Cited

UNITED STATES PATENTS

| | | |
|---|---|---|
| 2,323,519 | 7/1943 | Dean.....................60/60U |
| 2,665,777 | 1/1954 | Joanis...................60/52 B X |
| 3,131,538 | 5/1964 | Schultz et al. ..........60/525 X |
| 3,424,262 | 1/1969 | Kunz....................60/52 S UX |

*Primary Examiner*—Edgar W. Geoghegan
*Attorney*—Ken C. Decker and Plante, Hartz, Smith and Thompson

[57] ABSTRACT

A hydraulic brake booster is disclosed which provides a power assist to the vehicle operator during a brake application. Pressurized fluid is normally supplied to the booster from the vehicle's power steering pump. However, an electric pump is provided to supply fluid to the booster when the power steering pump malfunctions. Flow of fluid between the power steering pump and the booster is controlled by an operator-actuated spool valve which is shiftable from a first position in which the booster chamber is communicated to a fluid reservoir to a second position in which the fluid communication between the chamber and the reservoir is terminated and flow of fluid between the power steering pump and the chamber is initiated. However, when the electric pump is actuated, a stop piston prevents movement of the spool valve. Fluid at a relatively low pressure then circulates through the booster chamber and through internal passages within the spool valve. When the operator applies the brakes of the vehicle while the electric pump is operating, a cap member which is slidably mounted on the spool valve is shifted to a position impeding flow of fluid through the passages within the spool valve, thereby increasing the fluid pressure level within the chamber to apply the brakes of the vehicle.

12 Claims, 1 Drawing Figure

PATENTED SEP 5 1972
3,688,498
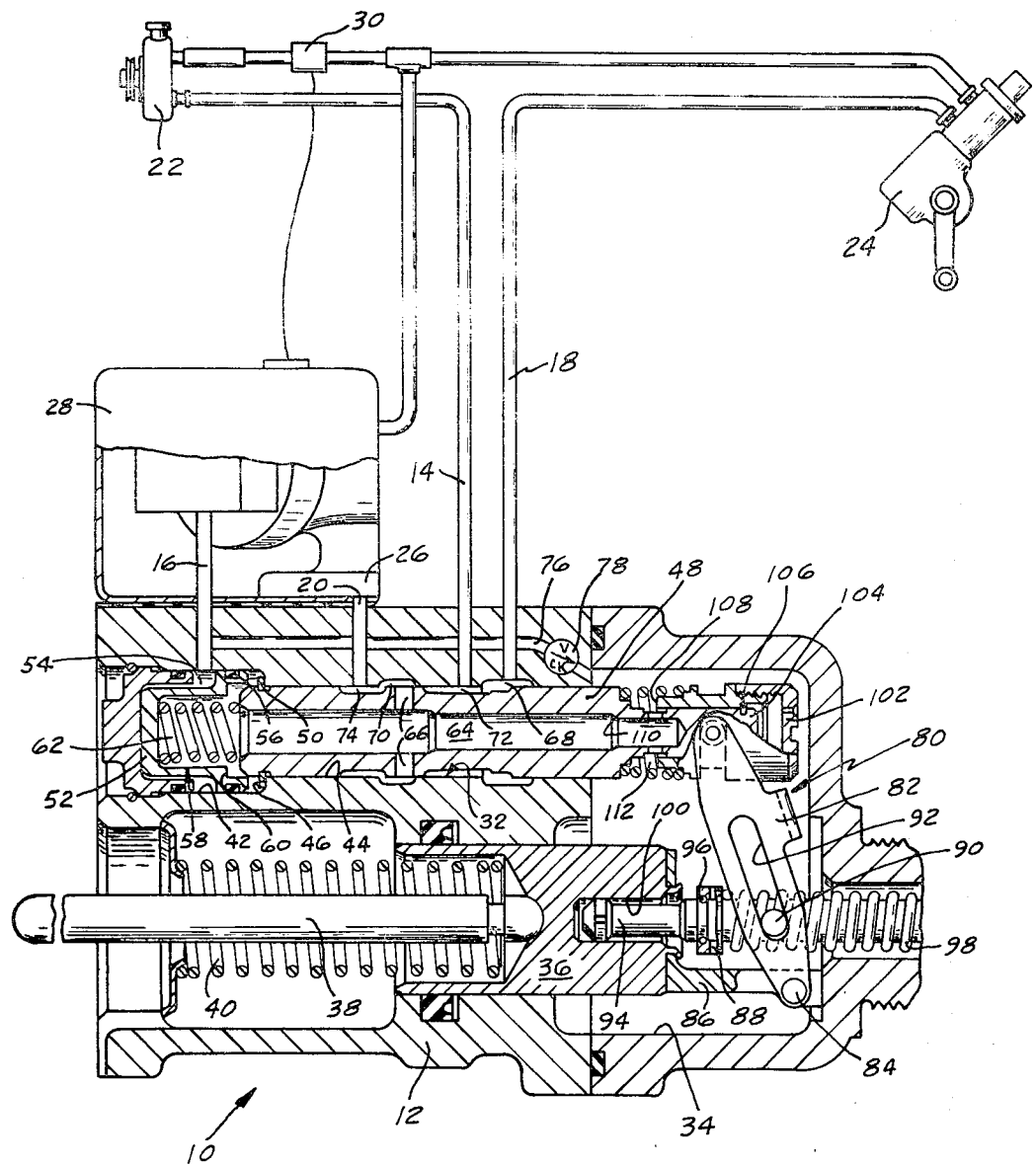
INVENTOR
LLOYD G. BACH
JEROME T. EWALD
KEITH H. FULMER
BY
ATTORNEY

AUXILIARY FLUID SUPPLY FOR BRAKE BOOSTER

BACKGROUND OF THE INVENTION

This invention relates to a vehicle hydraulic system which includes a hydraulic brake booster and an auxiliary electric pump for supplying fluid to the brake booster during emergency conditions.

Because of their smaller size and lower weight, hydraulic brake boosters are expected to be used in lieu of vacuum boosters in vehicles having power-assisted brakes in the near future. Such a device is disclosed in U.S. Pat. application Ser. No. 793,923, filed Jan. 16, 1969, now U.S. Pat. No. 3,603,209, granted Sept. 7, 1971, owned by the assignee of the present invention and incorporated herein by reference. This unit utilizes the pressurized fluid provided by the vehicle's power steering pump to provide a hydraulic assist to the vehicle operator when the brakes are applied. However, if a malfunction terminates flow of fluid to the booster from the power steering pump, the power braking assist is lost immediately and the vehicle operator must apply the brakes manually. It is therefore desirable to provide an auxiliary fluid supply so that, for example, if the vehicle's engine should die while the vehicle is in motion, the vehicle operator may safely bring the vehicle to a complete stop. Electric pumps operated from the vehicle's battery have been suggested in the past for performing this function. However, most of these prior art auxiliary electric pumps circulated fluid through the vehicle's entire hydraulic system so that they had to be quite large, and also required a fairly large amount of electrical power, which limited the length of time that they could be used.

SUMMARY OF THE INVENTION

Therefore, an important object of my invention is to provide a vehicle hydraulic system which includes a hydraulic brake booster and an auxiliary electric pump for supplying pressurized fluid to the booster when the power steering pump of the vehicle is inoperable.

Another important object of my invention is to minimize the size and capacity of the auxiliary electric pump.

Another important object of my invention is to reduce the fluid energy requirements of a hydraulic brake booster when fluid is supplied to the latter by an auxiliary electric pump.

DESCRIPTION OF THE DRAWINGS

The sole FIGURE of the drawing is a schematic view of a vehicle hydraulic system made pursuant to the teachings of my present invention with the hydraulic brake booster used therein illustrated in cross section.

DETAILED DESCRIPTION

Referring now to the drawing, a brake booster 10 includes a housing 12 having a pair of fluid inlet ports 14, 16 and a pair of fluid outlet ports 18, 20. The inlet port 14 is communicated to the outlet of a power steering pump 22, and the outlet port 18 is communicated with the inlet of a power steering gear 24. The outlet port 20 is communicated to a fluid reservoir 26 which in turn is communicated to the inlet of the power steering pump 22, as is the outlet of the power steering gear 24. The reservoir 26 is also communicated with the inlet of an electrically driven pump 28 which is powered by the vehicle's battery. Operation of the pump 28 is initiated when a flow or pressure sensitive switch 30 senses a drop in the rate of flow to the inlet of the power steering pump 22. The outlet of the pump 28 is communicated to the inlet port 16. The pump 28 may be of any type well known to those skilled in the art, such as the one disclosed in U.S. Pat. No. 3,265,007, owned by the assignee of the present invention, and incorporated herein by reference.

The housing 12 defines a bore 32 and a boost chamber 34 therewithin. A piston 36 is shiftable within the chamber 34, and a rod 38 interconnects one end of the piston 36 with a standard automotive master cylinder (not shown) mounted to the left of the booster housing 12, viewing the FIGURE. Therefore, movement of the piston 36 to the left, viewing the FIGURE, develops pressure in the master cylinder (not shown) in the normal manner to apply the brakes of the vehicle. The piston 36 is urged toward the brake release position by the return spring 40.

The bore 32 includes a larger diameter portion 42 and a smaller diameter portion 44 with a shoulder 46 therebetween. A spool valve 48 is slidably mounted in the smaller diameter portion 44 of the bore 32 and includes a stop washer 50 mounted on one end thereof. A stop piston 52 is slidably mounted in the larger diameter portion 42 of the bore 32 and cooperates with the end of the bore to define a fluid chamber 54 therebetween. The chamber 54 is communicated with the inlet 16. The stop piston 52 is stepped to present a larger diameter portion 56 and a smaller diameter portion 58 with a shoulder 60 therebetween.

A spring 62 yieldably urges the washer 50 into engagement with the shoulder 46. The spool valve is slidable in the bore 32 from a first position defined by the engagement of the stop washer 50 with the shoulder 46 to a second position in which the end of the spool valve 48 engages the shoulder 60 of the stop piston 52. The spool valve 48 controls fluid communication between the port 14, 18, 20 and the boost chamber 34 as the spool valve 48 is shifted from the first position to the second position. A longitudinally extending passage 64 and a plurality of transversely extending passages 66 are provided within the spool valve 48. Details of the construction and operation of the spool valve 48 are more completely disclosed in copending U.S. Pat. application Ser. No. 13,415, filed Feb. 24, 1970, now U.S. Pat. No. 3,633,462, granted Jan. 11, 1972, owned by the assignee of the present invention and incorporated herein by reference. Briefly, spool valve 48 cooperates with recesses in the housing 12 to define fluid cavities 68 and 70, while the housing 12 cooperates with recesses in the spool 48 to define cavities 72 and 74. When the spool valve 48 is disposed in the first position, substantially all of the fluid flowing into the inlet 14 flows directly from the cavity 72 to the cavity 68 and out of the outlet port 18, and the chamber 34 is vented through the passages 64 and 66 and the cavities 70, 74 to the outlet port 20 as will be more completely described herein. Another passage 76 communicates the inlet port 16 directly to the chamber 34, and is provided with a check valve 78 to prevent fluid from flowing from the chamber 34.

The valve 48 is shifted by operation of an operator-actuated means generally indicated at 80. Operator-actuated means 80 includes lever means 82, one end of which is pivotally connected as at 84 to a bracket 86 mounted on the piston 36. A caging member 88 is connected to the lever means 82 by pivots 90 which are received within slots 92. An actuating rod 94 extends through the caging member 88 and is provided with a stop ring 96 that is urged into engagement with the end of the caging member 88 by a spring 98. One end of the actuating rod 94 is slidably received in a blind bore 100 formed in the piston 36, and the other end of the rod 94 is operably connected to the usual brake pedal mounted in the operator's compartment of the vehicle. Details of the construction and operation of the operator-actuated means 80 are more completely described in copending U.S. patent application Ser. No. 35,800, filed May 8, 1970, now U.S. Pat. No. 3,625,005, granted Dec. 7, 1971 owned by the assignee of the present invention and incorporated herein by reference.

The other ends of the lever means 82 are pivotally connected to a cap member 102 which is slidably mounted on the reduced diameter end portion 104 of the spool valve 48. Cap member 102 is slidable from a first position defined by the engagement of a stop ring 106 carried on the spool valve 48 with a shoulder formed on the member 102 to a second position defined by the engagement of the end 108 of the member 102 with a shoulder 110 on the spool valve 48. A spring 112 yieldably urges the member 102 towards the first position. When the member 102 is disposed in the first position, fluid may flow freely between the chamber 34 and the passage 64; however, when the spool valve is disposed in the second position, flow between the chamber 34 and the passage 64 is impeded. Details of the construction and operation of the member 102 are more completely described in copending U.S. patent application Ser. No. 38,087, filed May 18, 1970, now U.S. Pat. No. 3,610,102, granted Oct. 5, 1971, owned by the assignee of the present invention and incorporated herein by reference.

MODE OF OPERATION

The sole FIGURE of the drawing illustrates the position of the various components of the brake booster 10 when the latter is functioning normally and when the brakes are released. In this position, substantially all of the fluid flowing into the inlet port 14 is communicated through the cavities 72 and 68 to the outlet port 18, and the chamber 34 is vented to the reservoir 26 through the outlet port 20. When a brake application is effected, the vehicle operator depresses the usual brake pedal in the operator's compartment, which moves the actuating rod 94 to the left viewing the FIGURE. Since the spring 98 is sufficiently strong to maintain the caging member 88 in engagement with the stop 96, movement of the rod 94 pivots the lever beam 82 about the pivot 84. Since the spring 112 is sufficiently strong to prevent relative movement between the member 102 and the valve 48 during normal operation of the brake booster 10, movement of the rod 94 transmitted through the lever means 82 shifts the spool valve 48 towards the second position. As the spool valve 48 shifts, fluid communication between the cavities 70 and 74 is terminated, thereby preventing fluid communication between the chamber 34 and the reservoir 26, and fluid communication between the cavities 72 and 70 is initiated. Therefore, a portion of the fluid flowing into the inlet port 14 is communicated through the passages 66 and 64 to the boost chamber 34. Increased pressure in the boost chamber 34 exerts a force on the piston 36 urging the latter to the left, viewing the FIGURE. Movement of the piston 36 develops pressure in the aforementioned master cylinder in the usual manner. When the vehicle's brakes are released, the springs 40 and 62 urge the piston 36 and spool valve 48 respectively towards the right, viewing the FIGURE, to the brake release position.

If the pump 22 ceases to operate, due either to a malfunction of the pump 22 itself or because the vehicle's engine has ceased to operate, the flow sensing switch 30 initiates operation of the electrically driven pump 28. When this occurs, high pressure fluid is communicated to the inlet port 16 to the chamber 54, thereby urging the piston stop 52 to the right, viewing the FIGURE, until the shoulder 60 engages the end of the spool valve 48 to prevent the latter from shifting from the first position. Fluid is also communicated from the inlet 16 to the chamber 34 through the passage 76. A flow path is thereby formed between the inlet and outlet of the pump through the inlet port 16, the passage 76, the check valve 78, the chamber 34, the longitudinal passage 64, the transversely extending passages 66, the cavities 70 and 74, the outlet port 20, and the reservoir 26. As long as the pump 22 does not operate, fluid flows through this flow path. The pressure level in the chamber 34 is normally of a very small magnitude and no breaking force is developed. When the vehicle operator applies the brakes, movement of the rod 94 pivots the levers 82 about the pivot 84. However, since the spool valve 48 cannot shift due to the engagement of the stop piston 52 with the end of the spool valve 48, the member 102 shifts relative to the spool valve 48. As the end 108 of the member 102 approaches the shoulder 110, flow from the chamber 34 into the longitudinal passage 64 will be impeded. Since the rate of fluid flow out of the pump 28 is substantially constant, the pressure level in the chamber 34 will increase, thereby shifting the piston 36 to the left, viewing the FIGURE, to apply the brakes of the vehicle. When the operator releases the brake pedal, the spring 112 urges the member 102 to the right viewing the FIGURE, thereby again preventing fluid to freely flow from the chamber 34 to the outlet port 20. Therefore, the fluid pressure level in the chamber 34 returns to a rather low level.

In case of a malfunction in both of the pumps 22 and 28, the brakes of the vehicle may still be applied manually. The increased actuating force required from the vehicle operator when the brakes are applied manually collapses the spring 98 permitting the stop 96 to move away from the caging member 88. The end of the rod 94 engages the end of the blind bore 100, permitting the vehicle operator to manually move the piston 36 to apply the vehicle's brakes.

We claim:
1. In a vehicle hydraulic system:
   a hydraulic boost device including a housing defining a chamber therewithin;
   a piston shiftable in said chamber;

a fluid pressure source in communication with said housing;

valve means within said housing for controlling flow of fluid between the pressure source and the chamber for shifting the piston;

operator-actuated means for operating said valve means;

a pump in fluid communication with said chamber; and means for sensing a malfunction of said pressure source for actuating said pump;

said valve means being operable to increase the pressure level of the fluid within said chamber upon operation of the operator-actuated means after actuation of said pump by said sensing means.

2. The invention of claim 1:

said valve means being slidable toward and away from a position communicating fluid from said pressure source to said chamber; and stop means within said housing preventing movement of said valve means upon actuation of said pump by the sensing means.

3. The invention of claim 1:

a fluid reservoir in communication with said boost device;

said valve means being shiftable from a first position venting said chamber to said reservoir to a second position terminating fluid communication between the chamber and the reservoir and communicating said chamber with said pressure source; and stop means within said housing preventing movement of said valve means to said second position upon actuation of said pump by the sensing means.

4. The invention of claim 3:

said stop means including a piston slidable within said housing from a first condition which permits movement of said valve means to said second position to a second condition which prevents movement of the valve means to said second position;

said piston cooperating with the walls of the housing to define a cavity therewithin in fluid communication with said pump whereby upon actuation of the latter said cavity is pressurized to force said piston toward the second condition.

5. The invention of claim 3:

said valve means defining internal passage means therewithin communicating said chamber to said reservoir when the valve means is disposed in said first position; and other passage means within said housing for communicating pressurized fluid from the pump to the chamber, said pressurized fluid being returned to the inlet of said pump through said internal passage means and said reservoir;

said valve means including other means for restricting flow of fluid through said internal passage means upon operation of the operator-actuated means after actuation of the pump by the sensing means.

6. The invention of claim 1:

a fluid reservoir in communication with said housing and with said pump;

said housing defining a bore therewithin in fluid communication with said pressure source and with said reservoir;

said valve means being a spool valve slidable in said bore between first and second positions and having passage means extending therethrough communicating the chamber with said reservoir when the spool valve is disposed in said first position, but communicating said pressure source with said chamber when the spool valve is disposed in said second position;

stop means movable within said bore to a position preventing movement of the valve means to said second position after actuation of the pump; and means on said valve means operated by said operator-actuated means to impede fluid communication through said passage means upon operation of the operator-operated means after actuation of said pump.

7. The invention of claim 6:

said last-mentioned means being a member slidably mounted on said spool valve and operably connected to the operator-actuated means;

said operator-actuated means sliding said member from a first position which permits fluid communication through said passage means to a second position which impedes fluid communication through said passage means whereby the fluid pressure level in said chamber is increased to a level sufficient to shift said piston; and resilient means yieldably urging said member towards its first position.

8. The invention of claim 1:

a fluid reservoir in communication with said housing and with said pump;

said housing defining a bore therewithin in fluid communication with said pressure source and said reservoir;

said valve means being a spool valve slidable in said bore between first and second positions and having internal passage means extending therethrough communicating the chamber with the reservoir when the spool valve is disposed in the first position but communicating the chamber with said pressure source when the spool valve is disposed in the second position;

stop means in said bore shiftable from a first condition permitting movement of said spool valve to its second position to a second condition preventing movement of the spool valve to its second position;

a connecting member slidably mounted on said spool valve interconnecting the latter with said operator-actuated means;

said connecting member being shiftable from a first position which permits fluid communication through said internal passage means to a second position which impedes flow of fluid through the latter; and resilient means yieldably urging said connecting member towards said first position whereby movement of the operator-actuated means is transmitted through said connecting member to shift said spool valve when the stop means is disposed in its first condition;

said resilient means yielding to permit movement of said connecting member to its second position upon operation of the operator-actuated means when the stop means is disposed in its second condition.

9. The invention of claim 3:
said fluid pressure source being a pump driven by the engine of the vehicle;
the inlet of each of said pumps being in fluid communication with said reservoir.

10. In a hydraulic boost device:
a housing having a pair of inlet ports, a pair of outlet ports, and a chamber therewithin in fluid communication with said inlet and outlet ports;
a piston shiftable in said chamber;
valve means slidable in said housing from a first position communicating said chamber with one of said outlet ports and one of said inlet ports with the other outlet port to a second position terminating fluid communication between the chamber and the one outlet port and communicating at least a portion of the fluid flowing into said one inlet port to said chamber;
operator-actuated means for shifting said valve means;
stop means within said housing responsive to a decrease in the rate of fluid flow through said one inlet port below a predetermined level to prevent movement of said valve to said second position;
the other of said inlet ports communicating fluid into said chamber when the rate of fluid flow through said one inlet port decreases below said predetermined level;
said valve means including other means to impede flow of fluid from the chamber to the one outlet port upon operation of the operator-actuated means during fluid communication into said chamber through said other inlet port whereby the fluid pressure level in said chamber is increased to shift said piston.

11. The invention of claim 10:
said valve means being a spool valve having passage means extending therethrough for communicating said chamber with the respective inlet and outlet ports as the spool valve is shifted from said first position to said second position;
said other means being a connecting member slidably mounted on said spool valve interconnecting the latter with said operator-actuated means and slidable from a first position permitting free flow of fluid between the chamber and the passage means to a second position in which flow between the chamber and the passage means is impeded.

12. The invention of claim 11; and
resilient means yieldably urging said connecting member towards said first position whereby movement of the operator-actuated means is transmitted through said connecting means to shift said spool valve when the stop means permits movement of the spool valve to its second position;
said resilient means yielding to permit movement of said connecting member to its second position when the stop means prevents movement of the spool valve to its second position.

* * * * *